United States Patent

[11] 3,589,213

[72] Inventor Eugene F. Gourley
  Meadville, Pa.
[21] Appl. No. 753,235
[22] Filed Aug. 16, 1968
[45] Patented June 29, 1971
[73] Assignee McCrosky Tool Corporation
  Meadville, Pa.

[54] TURRET TOOL POST AND HANDLE ASSEMBLY
  8 Claims, 5 Drawing Figs.

[52] U.S. Cl. .................................... 74/826,
  29/35.5, 29/48.5 R, 29/49, 82/36 A
[51] Int. Cl. ........................................ B23b 29/28
[50] Field of Search ........................... 74/826,
  815, 813; 82/36.1; 29/35.5, 48.5, 49

[56] References Cited
  UNITED STATES PATENTS

| | | | |
|---|---|---|---|
| 2,305,728 | 12/1942 | Millholland | 74/826 X |
| 2,547,616 | 4/1951 | Beekman | 74/826 X |
| 3,137,916 | 6/1964 | Leafquist et al. | 74/826 X |
| 3,422,710 | 1/1969 | Kilmer | 74/813 |

FOREIGN PATENTS

| 554,070 | 3/1958 | Canada | 82/36.1 |
|---|---|---|---|

Primary Examiner—Milton Kaufman
Assistant Examiner—F. D. Shoemaker
Attorney—Samuel Lebowitz ABSTRACT: A manually indexable turret tool post assembly mounted on a lathe or analogous machine compound by means of a rugged supporting column on which is rotatably mounted a turret body supporting a plurality of tools for selective operation on a workpiece in the lathe. The turret is clamped in one of a plurality of predetermined indexed positions by a rotary clamping head cooperating with a coupling member, each provided with circumferentially spaced projections alternating with recesses. The coupling member, with alternating bearing segments and indentations, is seated within the upper portion of said turret body for relative rotation therewith and is mounted nonrotatably on said column, although it is adapted for incremental radial adjustment thereon. Gradually sloping faces on camming lugs on the rotary clamping head cooperate with similar faces between said indentations and bearing segments to effect a downward movement of the coupling member and turret against the base of the column, and to clamp it in its indexed position by the final rotation of the clamping head on the upper end of the column, which is provided with relatively coarse threads having a fast lead. The turret is released from its clamped position by a reverse rotation of the clamping head for a limited extent, which effects the disengagement of the camming lugs from the bearing segments to permit a lifting of the turret body by spring action. An adjustable plunger in the clamping head cooperating with a milled keyway in the coupling member restricts the relative rotary movement between these units within proper limits.

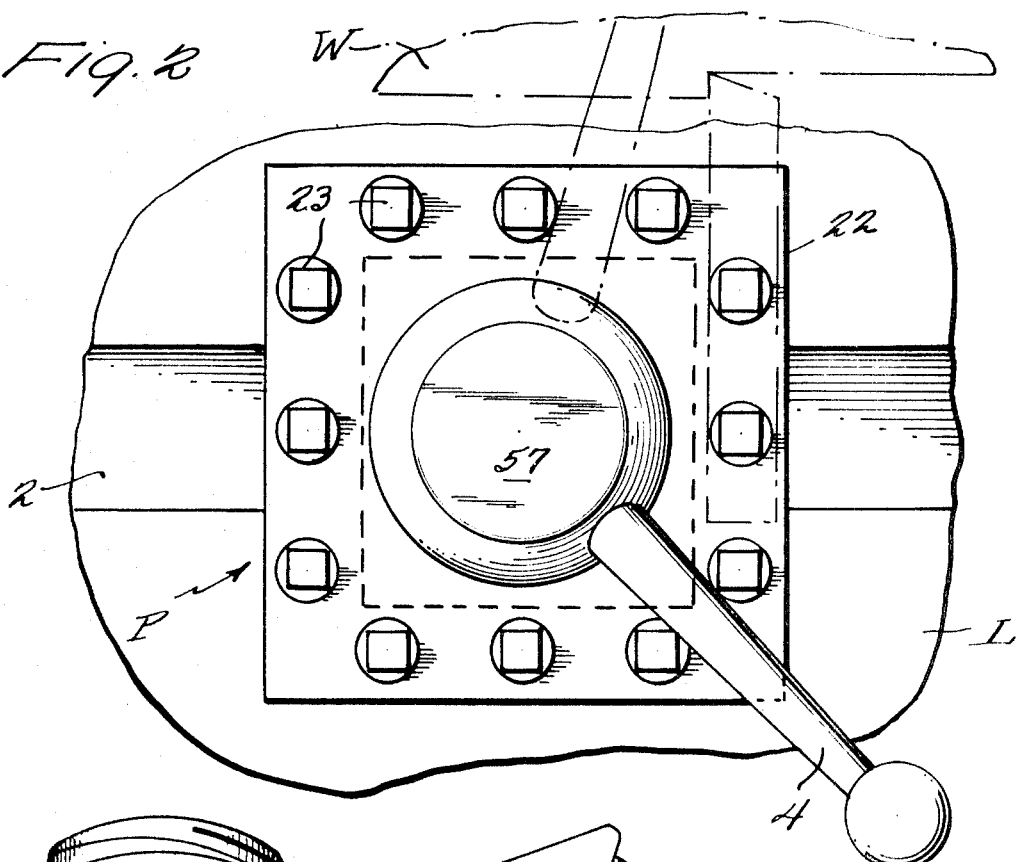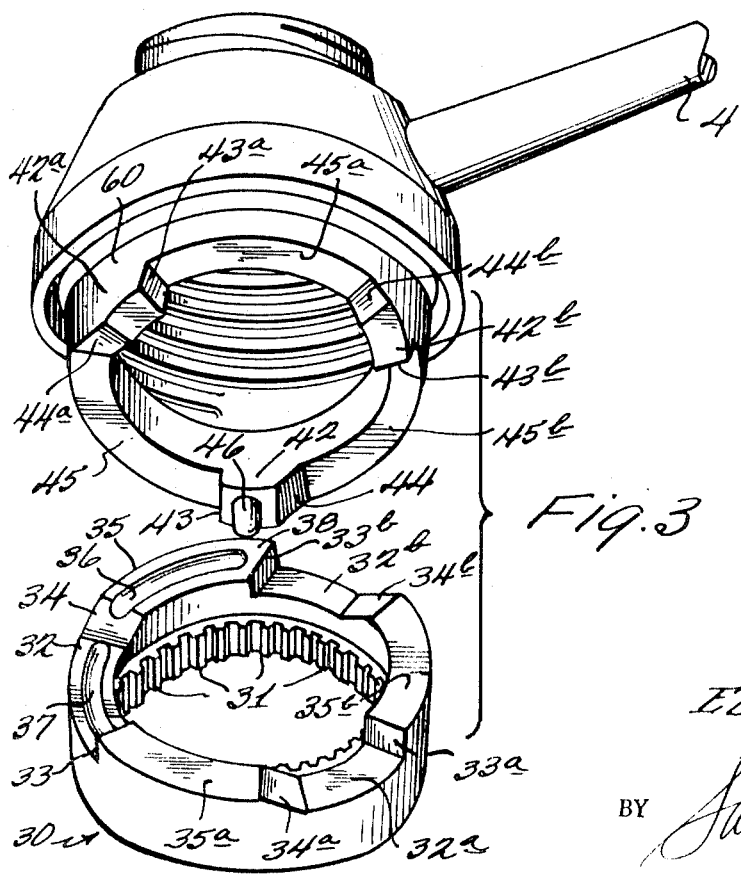

TURRET TOOL POST AND HANDLE ASSEMBLY

It is the object of the present invention to provide a rugged turret tool post assembly which permits successive tools to be swung into cutting position quickly, indexed accurately in any one of a plurality of indexing positions, and thereafter locked rigidly, this being done with a simple to-and-fro movement of a sturdily mounted handle which is capable of withstanding heavy loadings and vibrations, and which assures a positive locking of the tool post on the lathe or machine compound when handling interrupted cuts, or the high feeds and speeds of modern, heavy-duty production lathes.

It is another object of the invention to provide a turret tool post and handle assembly which may be shifted easily from the locked position of the tool post to its released position for the rapid manual indexing of the tool post to another operative position with respect to the workpiece being operated upon, with rapidity and no lost motion on the part of the operator.

The invention herein presents an improvement over the turret tool post assembly disclosed in U.S. Pat. No. 2,817,260, Dec. 24, 1957, which requires an up-and-down movement of the handle in addition to a to-and-fro movement thereof for the execution of similar releasing, indexing and locking operations.

It is another object of the invention to provide a tool post assembly of relatively few rugged parts for effecting the releasing and locking movements of the tool post on the supporting column, which may be kept clean from metallic chips and other foreign matter to extend the useful life of these parts. Furthermore, when wear of the operative coupling parts does take place, the assembly permits an easy relative angular shifting of these parts so that the operator may execute the same movements to which he is accustomed with the accomplishment of the same results. This is afforded by a vertically floating coupling member which is mounted on the supporting column by vertical splines and which may be shifted in an angular direction to a slight degree, to compensate for wear, to alter its position relative to a manually operated cooperating coupling member. Also, provision is made to prevent overtravel of the coupling parts in the to-and-fro motion of the control handle.

Other objects and purposes will appear from the detailed description of the invention following hereinafter, taken in conjunction with the accompanying drawings, wherein, FIG. 1 is a vertical sectional view of the turret tool post assembly in accordance with the invention, in locked position, with certain parts in elevation;

FIG. 2 is a plan view of the improved device;

FIG. 3 is an exploded perspective view showing the relative positioning of the clamping head and body coupling members;

Figure 1:
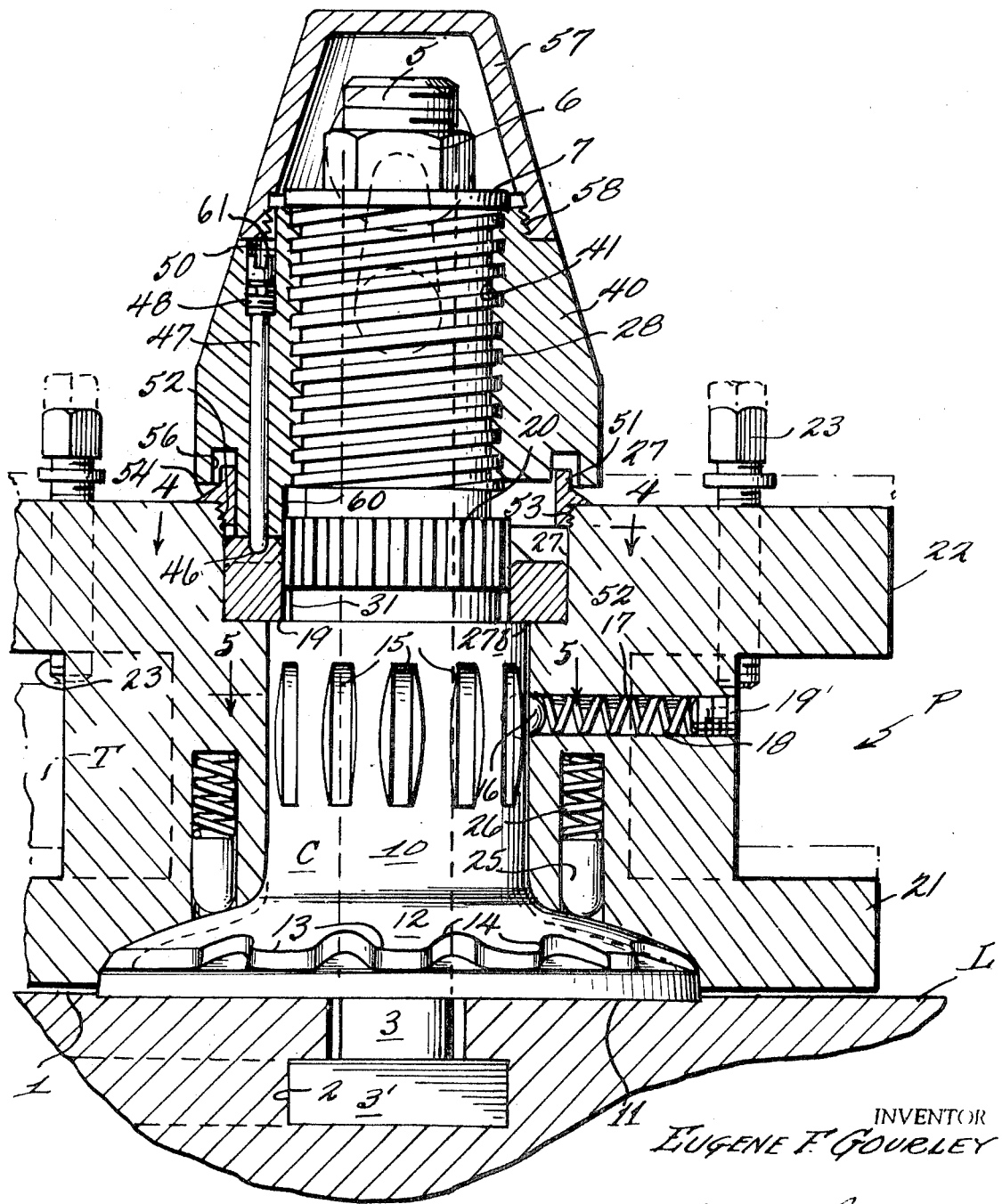
Figure 4:
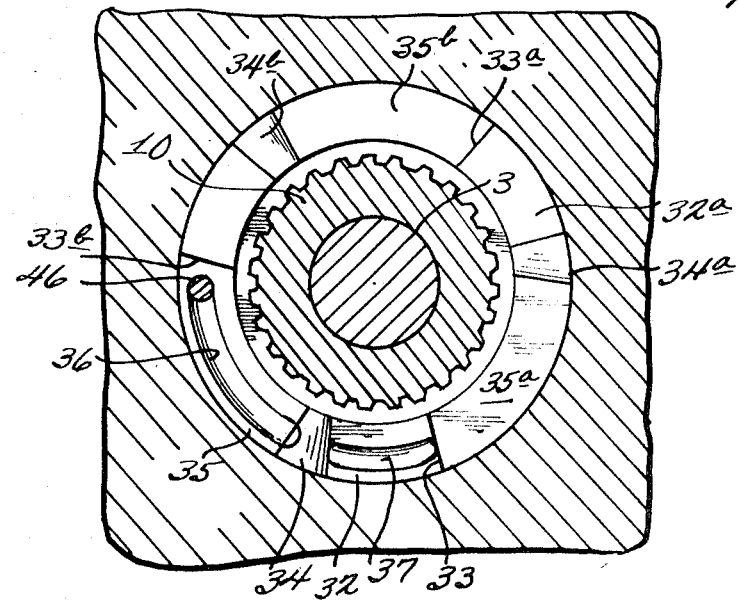
FIG. 4 is a horizontal sectional view along line 4—4 of FIG. 1.
Figure 5:
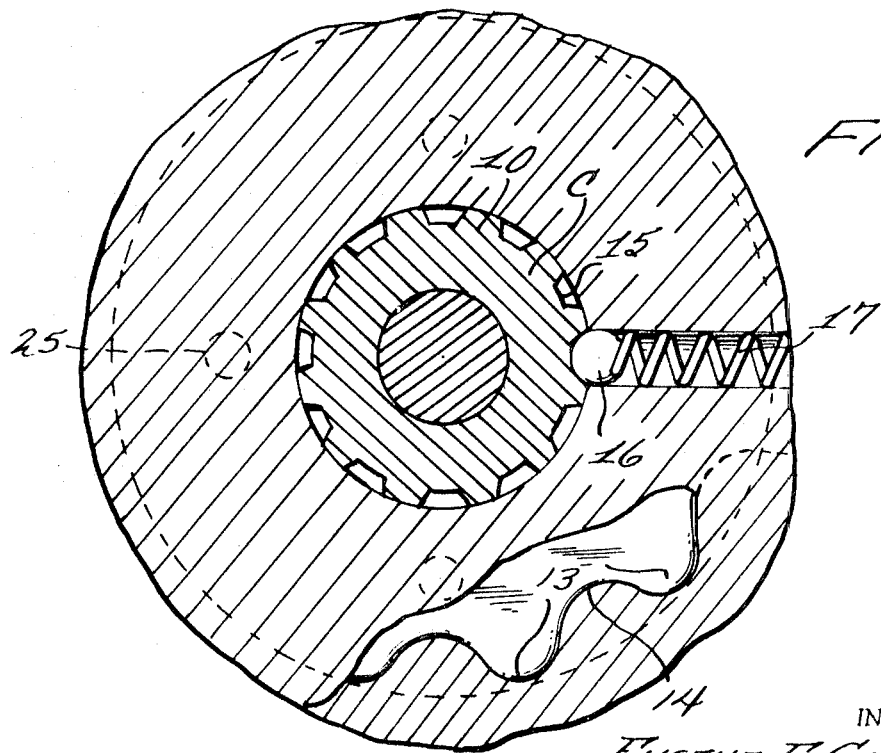
FIG. 5 is a horizontal sectional view along line 5—5 of FIG. 1, with certain parts broken away.

In the drawings is shown a turret tool post P mounted on a supporting column C for slight vertical movement along the axis thereof between its locked and released positions, and for free rotary movement thereabout to present one or more tools T which are clamped on the tool post for desired machining operations on a workpiece W mounted on the lathe or analogous machine.

The supporting column C is adapted to be clamped on the lathe bed L by a center bolt 3 fitted with a head 3' at its lower end which is movable along the inverted T-slot 2 in the lathe bed. The center bolt is threaded at its upper end 5, which end accommodates a threaded nut and a center bolt washer for the purpose of rigidly clamping the column C to the lathe at the working station of the latter.

As is known in the art, the column is provided with an enlarged annular base, the upper surface 12 of which is formed with a plurality of indexing lobes 13 with spaces 14 therebetween over which are adapted to be seated the turret tool post P having a central hub portion with spaced flanges 21 and 22 extending from the bottom and top thereof to form channels between them for receiving the shanks of the tool T which are adapted to be clamped selectively to the tool post along one or more faces thereof by means of the tool post screws 23.

The internal diameter of the hub or central portion of the tool post is slightly larger than the external diameter of the cylindrical portion 10 of the column adjacent to the annular base, so that the post may move freely on the column both axially and rotatably. The extent of the axial movement is indicated in FIG. 1 by dotted lines. Furthermore, while the bottom rim at the base of the turret 21 is finished with a plane surface which normally is disposed with a slight clearance above the lathe bed, the interior portion of the base is machined with a plurality of spaces and lobes which are complementary to those at the upper surface of the column so that these may be selectively intermeshed in the lowered position of the tool post, at which time the tool post is locked against rotary movement with respect to the column, as shown in FIG. 1.

The column and tool post are provided with twelve interengaging lobes and recesses so that the tool post is capable of being locked to the column in twelve indexing positions spaced 30° from each other. In supplement to the indexing lobes on the base of the column, twelve vertical grooves 15 are machined in the external lateral wall of the portion 10 of the column, coincident with the indexing lobes, and a ball 16 is selectively pressed into one of the vertical grooves by a spring 17 which is seated in a horizontal bore 18 in the hub of the turret, which bore is closed off by a capscrew 19; to force the ball 16 inwardly. This assembly aids in the indexing of the tool post as the same is rotated, by giving rise to audible clicks as the ball is seated and unseated successively in the vertical grooves as the turret tool post is turned.

The upper face 12 of the base of the column C is designed to cooperate with two or more spring pressed plungers 25 seated within vertical bores in the barrel of the turret, each of which is fitted with a spring 26 which tend to raise the turret P from the base of the column C. These lifting plungers 25 are equidistantly spaced around the turret and may be two, three or four in number, being disposed at diametrally disposed points, or at points displaced 120° or 90°, respectively.

The column C is reduced in diameter beyond the cylindrical portion 10, at approximately the midpoint of its total height, to form an annular shoulder 19, at approximately the same level as the base 27b of a cylindrical bore 27 of greater diameter than that in the hub of the tool post, which bore is formed in the upper portion of the latter. An annular clutch component or coupling member 30 is seated within bore 27 and is restrained in its movement in a vertical direction with the tool post by the series of vertical splines 31 on the whole interior of the coupling member which interengage complementary vertical splines 20 formed on the periphery of column C above the annular shoulder 19. The splines 20 on the column need not be around the entire lateral surface of the column to attain the feature of adjustment described below. For example, two groups of four splines each, may be provided, with the groups disposed at diametrally opposite portions of the column.

As described below, the coupling member 30 may be lifted to change the points of engagement of the splines 20 with those in the coupling member 31 to vary the angular position of the latter relative to the column C. This may be done in increments of one or more spline widths.

The annular coupling member 30 is machined on its top face to form a plurality of alternating bearing surfaces and indentations therebetween. In the illustrated embodiment, three of such sets of bearing surfaces, 35, 35a and 35b are equidistantly distributed at the upper face of the coupling member which, together with the adjacent indentations 32, 32a and 32b, respectively, are displaced at 120° intervals. The bearing member 35 merges with the adjacent indentation through an inclined face 34, and a vertical face 33 marks the terminal end of the indentation beyond the inclined face 34. Similar inclined faces 34a and 34b are at one of the ends of the indentations 32a and 32b and vertical faces 33a and 33b are at the opposite ends of the indentations 32a and 32b, respectively. In the illustrated embodiment, each bearing member subtends an arc of approximately 70° while the indentation and the inclined face which merges into it subtends an arc of approximately 50°, in each sector of 120°.

The upper end of the column C is threaded with a plurality of relatively coarse threads 28 having a fast lead, which are designated to cooperate with a clamping head 40 which is internally threaded at 41 with threads corresponding to threads 28 for engagement with the latter. The internally threaded clamping head 40, which is rotatably mounted at the top of the threaded column 28 is formed at the lower end thereof with a clutch component or coupling member 60 which may be formed integrally with the head or threaded thereinto. This annular coupling member 60 is formed of a plurality of coupling parts which interengage partially with those in the coupling member 30 which is seated in the body of the tool post. Thus, a plurality of camming lugs 42, 42a and 42b are disposed equidistantly around the coupling member and alternately project from the bottom face thereof with adjacent surfaces 45, 45a and 45b, which are relatively recessed. A projection of five thirty-seconds inch of the camming lugs beyond the adjacent surfaces has been found to be adequate. The leading edge of the camming lug 42 in the direction of rotation of the clamping head 40 in a counterclockwise direction, is provided with a vertical face 43 between the lowermost face of the cam lug 42 and the face of the recess 45 while the trailing edge of the camming lug 42 merges with the adjacent recessed surface by way of an inclined plane face 44 which may have an angularity of 26° or the like. Similarly, vertical faces 43a and 43b, and inclined faces 44a and 44b constitute parts of the camming lugs 42a and 42b, respectively. The camming lugs including the inclined faces may subtend an arc of 300°, leaving 90° for the recessed segments between them.

The clamping head 40 is adapted for convenient rotary movement by the mounting of a handle 4 therein which extends laterally therefrom, as shown in FIG. 2, and the movement of the handle from the position shown in FIG. 2 to the position shown in dotted lines, representing a throw of approximately 120°, is sufficient to shift the camming lugs 42, 42a and 42b from the superposition of these on the bearing segments 35, 35a and 35b, respectively, to the position where these camming lugs superpose the indentations 32, 32a and 32b, respectively. When this takes place in conjunction with the upward travel of the clamping head by virtue of the lead of the threads, the spring-pressed lifting plungers 25 are free to release the bottom of the turret tool post from the base of the column so that the interengaging lobes and spaces on the column and the tool post are freed, and the tool post is free for rotary movement along the cylindrical portion 10 of the column. Thus, the tool post may be manually indexed to any one of 12 positions in order to present any other desired tool which is clamped in the tool post into the field of operation of the workpiece W.

The clicking sounds occasioned by the ball 16 as it engages and disengages the successive grooves 15 in the lateral wall of portion 10 of the column serves to indicate an indexed position which requires locking, once the turret is turned to the selected position.

To effect this locking, the handle 4 is returned from the position shown in dotted lines in FIG. 2 to that shown in full lines, which results in a clockwise rotation of the clamping head 40. This rotation is permitted by the camming lugs 42, 42a and 42b in coupling member 60 seated within the indentations 32, 32a, and 32b in the coupling member 30, by virtue of the inclined faces 44, 44a and 44b riding up against the inclined faces 34, 34a and 34b to bring the bases of the camming lugs in overlying relation to the bearing segments 35, 35a and 35b. This movement causes the turret tool post P to be pressed downwardly against the force of the springs 26 seated behind the lifting plungers 25 to bring the lobes of the tool post into locking engagement with the spaces 14 between the lobes 13 in the base of the column.

In order to prevent an overtravel of the handle lever 4 in a clockwise direction, which might carry the respective camming lugs into the respective indentations in trailing relation with respect to them, which would release the tool post, provision is made for a definite limit stop of the handle in this clockwise travel.

For this purpose, one of the bearing segments 35 is milled with a groove of semicircular configuration in a cross section at 36 and this groove is continued in the adjacent indentation 32 between the base of the inclined face 34 and vertical face 33 (FIG. 3). A plunger 47, having a semispherically shaped end 46 at its lower portion, is adjustably mounted in the clamping head 40 by seating the threaded head 48 at the top of the plunger, in a correspondingly threaded recess 50 in the top of the head to position the rounded end 46 beyond the base of the camming lug 42 at an adjustable level. This end 46 rides in the groove 36 and 37 in the course of the releasing or counterclockwise movement of handle 4. In the return movement of handle 4, the end 46 rides along groove 37 from the vertical face 33 onto inclined face 34 and through the major length of the groove 36. However, this groove stops short approximately one-eighth inch from the vertical face 33b of the indentation 32b behind it, so that when the end 46 reaches the end of groove 36 the clamping head 40 can move no further. Thereby, a limit stop is provided for the handle 4 in its clockwise movement.

In order to adjust plunger 47 for effective operation, its rounded end 46 is seated in groove 36 by rotating the head 48 in recess 50. It is then backed off slightly and thereafter lockscrew 61 is threaded into the recessed bore 50 and tightened against the top of the threaded head 48, so that the adjustment is not affected by vibrations or other movements.

The vertical faces 43, 43a and 43b of the camming lugs acting against the vertical faces 33, 33a and 33b in the coupling member 30 serve as a limit stop for the handle in its counterclockwise movement when the turret is released from locking engagement with the column. Thus, limit stops are provided for the movement of the handle 4 in both releasing and locking directions.

An effective dust seal may be provided by mounting an annular shoulder 51 at the rim of the bore 27 in the central portion of the top of the tool post. This shoulder may be threaded into the upper edge of the bore by means of internal threads 52 in the latter engaging external threads 53 in the base of the shoulder. The dust collar 54 flaring from the shoulder is screwed into contact with the upper face of the tool post to exclude metal chips and other foreign matter from the coupling members 30 and 60. An annular recess 56 is provided in the base of the clamping head 40 to accommodate the shoulder 51 in the upward travel of the tool post when the latter is released from the base of the column.

The assembly may be given a finished appearance by a cover 57 for the clamping head which may be screwed to the upper portion of the head by cooperating threads on the latter and the interior of the cover as shown in FIG. 1. Thus, the cover 57 conceals the upper end of the column C and the fastening means therefor.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. In an apparatus of the class described,
    a. a support for an indexable multiple tool holder of the turret type comprising a cylindrical column with an outwardly extending annular base at the bottom and external threads at the top thereof,
    b. a turret body surrounding said column above said base, with interengaging means on said base and the bottom of said turret body for locking said body against rotary movement, c. spring means within said turret body and cooperating with said base, normally biased to move said turret body from said base to free said interengaging means and to permit manual rotary movement of said turret body relative to said column, d. a manually operated clamping head having a handle lever extending laterally therefrom and provided with internal threads engaging said external threads to effect both rotary movement as well as a translating movement of said head along the axis of said column;

e. a clutch assembly between said clamping head and turret body comprising f. an annular coupling member on said clamping head provided with a plurality of radially displaced camming lugs projecting from the bottom face of said coupling member, g. a second annular coupling member mounted on said cylindrical column at the top of said turret body and provided with a plurality of radially displaced bearing segments on the upper surface thereof, with indentations formed therebetween for the accommodation of said camming lugs, h. said camming lugs disposed in superposed relation to said bearing segments in the locked position of the turret body on said base, and adapted to be rotated by said clamping head in one direction in overlying relation to said indentations, to effect a seating of the camming lugs within the latter by the effect of said spring means and a consequent lifting of said turret body from said interengaging means, to permit a manual rotation of said turret body to a newly indexed position, i. said camming lugs each provided with a substantially vertical face at its leading edge upon rotation in said one direction with a gradually sloping face at its trailing edge, and said indentations each having a gradually sloping face at one end thereof to permit a rotation of said clamping head in the reverse direction and the relative movement of said camming lugs in superposed relation to said bearing segments, thereby to force said turret body downwardly into interengaging relation with said base in said newly indexed position, and j. one of said bearing segments of said second annular coupling member having an arcuate milled groove therein with a continuation thereof in the next adjacent indentation which first receives said vertical face of the overlying camming lug, a fixed plunger extending downwardly through said last-mentioned camming lug with the bottom end thereof rounded in conformity with the cross-sectional contour of said arcuate milled groove, said groove in said one bearing segment terminating short of the edge thereof remote from said continuation to prevent overtravel of said first annular coupling member in said reverse direction.

2. An apparatus as set forth in claim 1, wherein the bottom end of said plunger is contoured semispherically and the upper end is threaded for mounting at an adjustable level in a threaded bore of said overlying camming lug.

3. An apparatus as set forth in claim 2 including a lockscrew in said threaded bore above said last-mentioned upper end adapted to be tightened thereagainst to fix said adjustable level.

4. An apparatus as set forth in claim 2 wherein said spring means comprises a plurality of circumferentially displaced vertically disposed spring-pressed plungers within said turret body acting against the upper surface of said annular base.

5. In an apparatus of the class described, a. a support for an indexable multiple tool holder of the turret type comprising a cylindrical column with an outwardly extending annular base at the bottom and external threads at the top thereof, b. a turret body surrounding said column above said base, with interengaging means on said base and the bottom of said turret body for locking said body against rotary movement, c. spring means within said turret body and cooperating with said base, normally biased to move said turret body from said base to free said interengaging means and to permit manual rotary movement of said turret body relative to said column, d. a manually operated clamping head having a handle lever extending laterally therefrom and provided with internal threads engaging said external threads to effect both rotary movement as well as a translating movement of said head along the axis of said column;

e. a clutch assembly between said clamping head and turret body comprising f. an annular coupling member on said clamping head provided with a plurality of radially displaced camming lugs projecting from the bottom face of said coupling member, g. a second annular coupling member mounted on said cylindrical column at the top of said turret body and provided with a plurality of radially displaced bearing segments on the upper surface thereof, with indentations formed therebetween for the accommodation of said camming lugs, h. said camming lugs disposed in superposed relation to said bearing segments in the locked position of the turret body on said base, and adapted to be rotated by said clamping head in one direction in overlying relation to said indentations, to effect a seating of the camming lugs within the latter by the effect of said spring means and a consequent lifting of said turret body from said interengaging means, to permit a manual rotation of said turret body to a newly indexed position, i. said camming lugs and indentations each having a gradually sloping face at one end thereof to permit a rotation of said clamping head in the reverse direction and the relative movement of said camming lugs in superposed relation to said bearing segments, thereby to force said turret body downwardly into interengaging relation with said base in said newly indexed position, j. means for varying the radial position of said second annular coupling member relative to said supporting column comprising k. a plurality of vertical splines on said cylindrical column adjacent to the upper portion of said turret body and within a central cylindrical bore formed in the latter, l. said second annular coupling member seated in said last-mentioned bore of the turret body with vertical splines around its whole internal periphery which are complementary to the vertical splines on said cylindrical column, m. said last-mentioned member adapted to be shifted in increments of a spline width, to adjust the relative angular displacement between said coupling members.

6. In an apparatus of the class described, a. a support for an indexable multiple tool holder of the turret type comprising a cylindrical column with an outwardly extending annular base at the bottom and external threads at the top thereof, b. a turret body surrounding said column above said base, with interengaging means on said base and the bottom of said turret body for locking said body against rotary movement, c. spring means within said turret body and cooperating with said base, normally biased to move said turret body from said base to free said interengaging means and to permit manual rotary movement of said turret body relative to said column, d. a manually operated clamping head having a handle lever extending laterally therefrom and provided with internal threads engaging said external threads to effect both rotary movement as well as a translating movement of said head along the axis of said column;

e. a clutch assembly between said clamping head and turret body comprising f. an annular coupling member on said clamping head provided with a plurality of radially displaced camming lugs projecting from the bottom face of said coupling member, g. a second annular coupling member mounted on said cylindrical column at the top of said turret body and provided with a plurality of radially displaced bearing segments on the upper surface thereof, with indentations formed therebetween for the accommodation of said camming lugs, h. said camming lugs disposed in superposed relation to said bearing segments in the locked position of the turret body on said base, and adapted to be rotated by said clamping head in one direction in overlying relation to said indentations, to effect a seating of the camming lugs within the latter by the effect of said spring means and a consequent lifting of said turret body from said interengaging means, to permit a manual rotation of said turret body to a newly indexed position, i. said camming lugs and indentations each having a gradually sloping face at one end thereof to permit a rotation of said clamping head in the reverse direction and the relative movement of said camming lugs in superposed relation to said bearing segments, thereby to force said turret body downwardly into interengaging relation with said base in said newly indexed position, j. an annular shoulder mounted on the top of said turret body and projecting from the top face thereof in surrounding relation to said second annular coupling member, and said clamping head having an annular groove on the bottom face thereof in overlying relation to said shoulder for the accommodation of the latter in the course of the translating movements of said head and turret body to prevent the entry of foreign matter to said coupling members, k. said annular shoulder being detachably connected to said turret body through the intermediary of cooperating screw threads and provided with a dust collar flaring from the external surface of said annular shoulder for seating on the top of said turret body.

7. In an apparatus of the class described, a. a support for an indexable multiple tool holder of the turret type comprising a cylindrical column with an outwardly extending annular base at the bottom and external threads at the top thereof, b. a turret body surrounding said column above said base, with interengaging means on said base and the bottom of said turret body for locking said body against rotary movement, c. spring means within said turret body and cooperating with said base, normally biased to move said turret body from said base to free said interengaging means and to permit manual rotary movement of said turret body relative to said column, d. a manually operated clamping head having a handle lever extending laterally therefrom and provided with internal threads engaging said external threads to effect both rotary movement as well as a translating movement of said head along the axis of said column, e. a clutch assembly between said clamping head and turret body comprising f. an annular coupling member on said clamping head provided with a plurality of radially displaced camming lugs projecting from the bottom face of said coupling member, g. a second annular coupling member mounted on said cylindrical column at the top of said turret body and provided with a plurality of radially displaced bearing segments on the upper surface thereof, with indentations formed therebetween for the accommodation of said camming lugs, h. means for adjusting incrementally the radial position of said second annular coupling member relative to said supporting column, i. said camming lugs disposed in superposed relation to said bearing segments in the locked position of the turret body on said base, and adapted to be rotated by said clamping head in one direction in overlying relation to said indentations, to effect a seating of the camming lugs within the latter by the effect of said spring means and a consequent lifting of said turret body from said interengaging means, to permit a manual rotation of said turret body to a newly indexed position, j. said camming lugs each provided with a substantially vertical face at its leading edge upon rotation in said one direction with a gradually sloping face at its trailing edge, and said indentations each having a gradually sloping face at one end thereof to permit a rotation of said clamping head in the reverse direction and the relative movement of said camming lugs in superposed relation to said bearing segments, thereby to force said turret body downwardly into interengaging relation with said base in said newly indexed position, and k. said camming lugs being of lesser arcuate length than said indentations.

8. An apparatus as set forth in claim 7 including an annular shoulder mounted on the top of said turret body at the periphery of said cylindrical bore and projecting from the top face thereof in surrounding relation to said second annular coupling member, and said clamping head having an annular groove on the bottom face thereof in overlying relation to said shoulder for the accommodation of the latter in the course of the translating movements of said head and tool post to prevent the entry of foreign matter to said coupling members.